(12) United States Patent
Adamo et al.

(10) Patent No.: US 8,935,548 B2
(45) Date of Patent: Jan. 13, 2015

(54) DC-DC CONVERTER AND OPERATING METHOD THEREOF

(71) Applicant: STMicroelectronics S.R.L., Agrate Brianza (MB) (IT)

(72) Inventors: Santicarlo Adamo, Aci Castello (IT); Sergio Fabiano, Siracusa (IT); Francesco Pirozzi, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 168 days.

(21) Appl. No.: 13/764,071

(22) Filed: Feb. 11, 2013

(65) Prior Publication Data

US 2013/0320957 A1 Dec. 5, 2013

(30) Foreign Application Priority Data

Jun. 5, 2012 (IT) ............... MI2012A0974

(51) Int. Cl.
| | |
|---|---|
| *G06G 1/00* | (2006.01) |
| *G05F 3/08* | (2006.01) |
| *H02M 3/157* | (2006.01) |
| *G06F 1/26* | (2006.01) |
| *G06F 1/32* | (2006.01) |
| *H02M 1/00* | (2006.01) |

(52) U.S. Cl.
CPC .............. *G05F 3/08* (2013.01); *H02M 3/157* (2013.01); *G06F 1/266* (2013.01); *G06F 1/3296* (2013.01); *H02M 2001/0025* (2013.01)
USPC .......................................... 713/300; 323/283

(58) Field of Classification Search
USPC ................. 323/222, 271, 282, 283, 284, 285; 713/300, 310, 320, 321, 322, 330
See application file for complete search history.

(56) References Cited

U.S. PATENT DOCUMENTS

| | | | |
|---|---|---|---|
| 2006/0053309 A1* | 3/2006 | Vereen et al. ................. | 713/300 |
| 2008/0098248 A1* | 4/2008 | Maher et al. .................. | 713/324 |
| 2009/0187773 A1* | 7/2009 | Pastorello et al. ............ | 713/300 |
| 2009/0204831 A1 | 8/2009 | Cousson et al. | |
| 2010/0176776 A1 | 7/2010 | Wachi | |

* cited by examiner

*Primary Examiner* — Nguyen Tran
(74) *Attorney, Agent, or Firm* — Allen, Dyer, Doppelt, Milbrath & Gilchrist, P.A.

(57) ABSTRACT

A DC-DC converter includes an interface to receive data having voltage values. A first circuit carries out a voltage transition from a previously received voltage value to a received voltage value (VSEL). A second circuit activates or inactivates the first circuit in response to an activation signal or a stop signal provided by the interface. A third circuit configures the second circuit so that, when new data including a new voltage value is received during a voltage transition, the second circuit interprets the stop signal as an activation signal for the first circuit to carry out a new voltage transition. The setting circuit sets at least one parameter needed by the first circuit to carry out the new voltage transition in response to the new data and before the end of the new voltage transition.

28 Claims, 4 Drawing Sheets

DC-DC CONVERTER AND OPERATING METHOD THEREOF

FIELD OF THE INVENTION

The present invention relates to DC-DC converters, and more particularly, to a step down DC-DC converter and to a method for operating the same.

BACKGROUND OF THE INVENTION

Step down DC-DC converters are well known, and are commonly used in devices as such as computers and smart phone, for example. High-frequency synchronous step down DC-DC converters for battery-powered portable applications provide a dynamic voltage scaling feature, and generate a programmed output voltage transition with a programmed voltage target and a programmed voltage slew rate. These programmable parameters are configured via an interface within the DC-DC converter.

Step down DC-DC converters support low-voltage DSPs (Digital Signal Processor) and processor cores, including submicron processes and their retention modes. These devices also address digital voltage scaling technologies.

Typically, step down DC-DC converters can start a voltage transition in two ways. In one way the microprocessor programs via an interface, for example via I2C, a bit to start the voltage transition. In a second way the microprocessor drives one or more DC-DC converter device external pins to start the voltage transition.

In the second case the voltage transition is started immediately, without the latency introduced in the first case by having to communicate to set the DC-DC device bit which starts the voltage transition. The drawback of the first case is that these small devices need one or more external pins to quickly start the programmed voltage transitions, and one or more voltage target registers are also needed.

SUMMARY OF THE INVENTION

An object of the present invention is to provide a DC-DC converter with a reduced pin count while maintaining performance in terms of zero latency output voltage transitions.

One aspect of a DC-DC converter comprises an interface to receive data having voltage values, a first circuit configured to carry out a voltage transition from a previously received voltage value to a received voltage value, and a setting circuit for setting the parameters for the first circuit to carry out the voltage transition in response to at least the received data. A second circuit may be configured to activate or inactivate the first circuit in response to an activation signal or a stop signal derived from the interface.

A third circuit may be able to configure the second circuit so that, when new data including a new voltage value is received during a voltage transition carried out by the first circuit, the second circuit interprets the stop signal as an activation signal of the first circuit to carry out a new voltage transition. The setting circuit may be configured to set at least one parameter needed by the first circuit to carry out the new voltage transition in response to the new data, and before the end of the voltage transition.

BRIEF DESCRIPTION OF THE DRAWINGS

The features and advantages of the present invention will be apparent from the following detailed description, shown by way of non-limiting examples in the accompanying drawings, wherein.

DETAILED DESCRIPTION OF THE PREFERRED EMBODIMENTS

Figure 1:
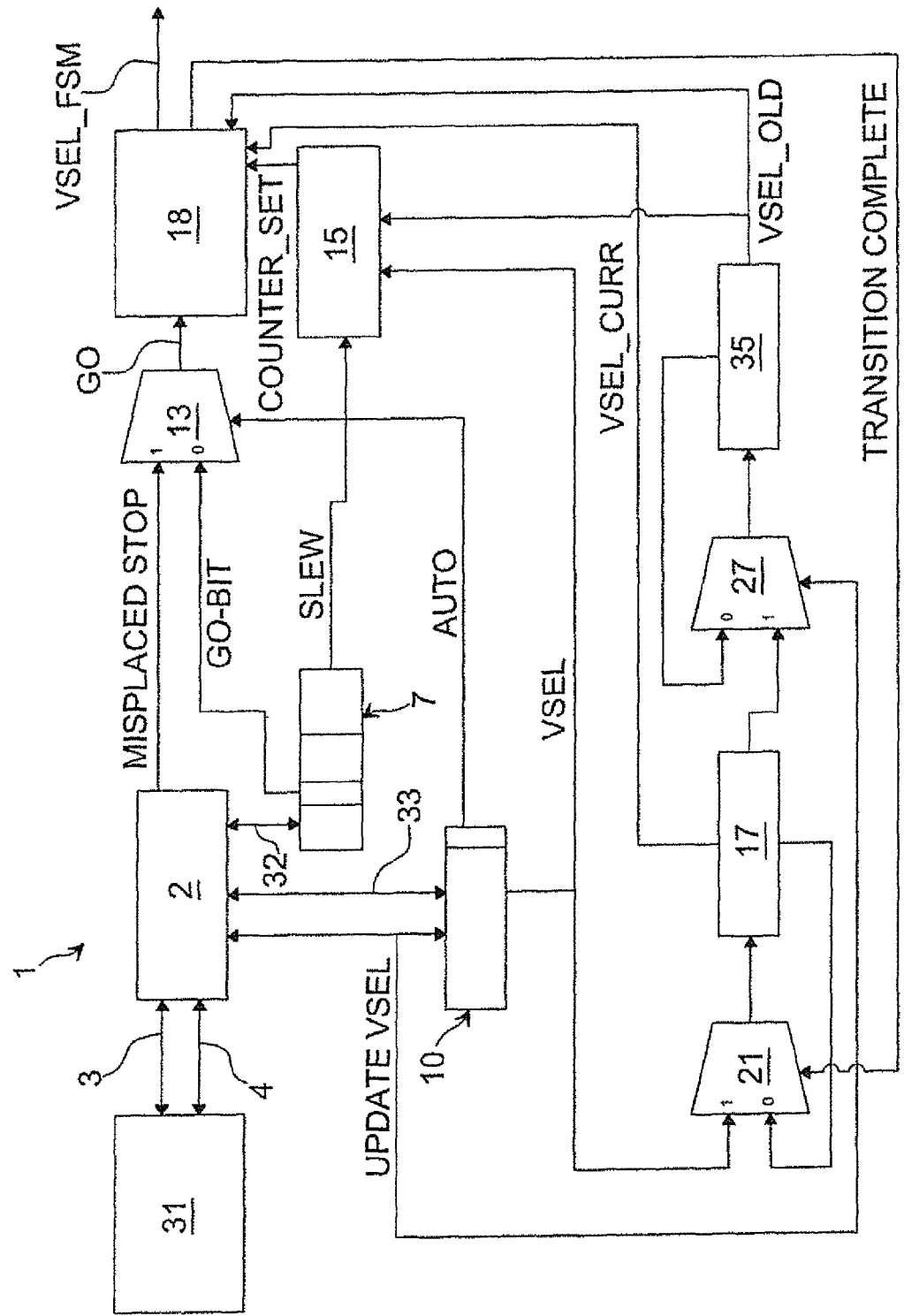
FIG. 1 is a block diagram of a DC-DC converter according to the present invention.

With reference to FIG. 1, a DC-DC converter 1, and more particularly, a step down DC-DC converter, is shown. The converter comprises an interface 2, preferably an I2C interface, configured to receive signals. The signals include data and control signals from a microprocessor 31 external the step down DC-DC converter. The converter 1 receives from the microprocessor 31 a voltage value or voltage target VSEL and a slew rate SLEW on a typical line, called an SDL (Serial Data Line) 4, for the transmission of serial data. The converter 1 receives from the microprocessor 31 a synchronization signal on a typical line, called an SCL (Serial Clock Line) 3, for the synchronization.

The DC-DC converter 1 comprises a first circuit 18 configured to carry out a voltage transition from a previously received voltage value VSEL_OLD (the starting point of the voltage transition) to a received voltage value VSEL (the final point of the voltage transition). More particularly, this is from a previously received voltage value VSEL_OLD to the currently received voltage value VSEL. The previously received voltage value VSEL_OLD is the last voltage value received by the first circuit before the currently received voltage value VSEL in time. The first circuit 18 is configured to carry out the voltage transitions from a starting point to a final point in a time succession. The starting point is the previously received voltage value VSEL_OLD and the final point is the received voltage value in time so that in a new voltage transition the final point is the new voltage value and the starting point is the voltage value representing the final point of the preceding voltage transition. The first circuit 18 is configured to carry out each voltage transition after the end of the preceding voltage transition.

The DC-DC converter 1 comprises a setting circuit for setting the parameters needed by the first circuit to carry out the voltage transition in response to at least the received signals. The DC-DC converter comprises a second circuit configured to activate or inactivate the first circuit in response to an activation signal or a stop signal derived from the interface 2.

The setting circuit comprises two registers 7 and 10, preferably two 8-bit registers, which communicate with the interface 2 respectively through buses 32 and 33. The register 10 is configured to store the voltage target VSEL, preferably a 7-bit voltage target, received through the bus 33. The register 7, instead, is configured to store the slew rate SLEW, preferably a 3-bit slew rate, received through the bus 32, and store a bit GO-BIT that is always received through the bus 32. This allows the first circuit 18 to be initialized. The first circuit may be a finite state machine (FSM).

The second circuit comprises a multiplexer 13 driven by the bit AUTO and is configured to allow initialization of the FSM 18 by the signal GO. The multiplexer 13 is configured to have at its inputs the signal GO-BIT (at the input 0) and the signal MISPLACED STOP (at the input 1) derived from the interface 2. Selection between the two input signals is based on the signal AUTO.

The FSM 18 is configured to provide the output voltage VSEL_FSM of the converter 1 according to the parameters set by the setting circuit. The parameters comprise an input signal COUNTER-SET coming from a calculation unit 15, the previously received voltage value VSEL_OLD and the current voltage value VSEL_CURR.

The signal COUNTER-SET sets the voltage transition duration. This value is calculated based on the voltage value VSEL, the old voltage value VSEL-OLD and the slew rate value SLEW. The value SLEW of the slew rate is derived from the register 7, the value VSEL is derived from the register 10, and the value VSEL_OLD is derived from the register 35, which is preferably an 8-bit register. The signal COUNTER_SET is set to a value equal to CEIL[(VSEL_OLD−VSEL)/n], where n is equal to SLEW/8 and CEIL indicates the integer number next to the value (VSEL_OLD−VSEL)/n. This value corresponds to the number of clock cycles required to complete the voltage transition.

Another two multiplexers 21 and 27 are provided. The multiplexer 21 has at its inputs the programmed voltage target VSEL derived from the register 10 or the value VSEL_CURR derived from the register 17. The multiplexer 21 is driven by a signal TRANSITION COMPLETE derived from the FSM 18 when the voltage transition of the FSM ends. Reception of the signal TRANSITION COMPLETE enables writing the voltage value VSEL on the 8-bit register 17 so that the new value VSEL_CURR becomes the voltage value VSEL. The signal TRANSITION COMPLETE allows shifting of the value VSEL from the register 10 to the register 17.

The multiplexer 27 has at its inputs the value VSEL_CURR derived from the register 17 or the value VSEL_OLD derived from the register 35. The multiplexer 27 is driven by the signal UPDATE_VSEL derived from the interface 2. The reception of the signal UPDATE_VSEL enables writing the value VSEL_CURR on the 8-bit register 35 so the new value VSEL_OLD is the value VSEL_CURR. The signal UPDATE_VSEL allows shifting of the value VSEL_CURR from the register 17 to the register 35.

The interface 2 provides the signal UPDATE_VSEL, which may be a single bit, for example, to drive the multiplexer 27 through a line. The signal UPDATE_VSEL indicates a possible reprogramming by the microprocessor 31.

The DC-DC converter 1 comprises a third circuit to configure the second circuit only when new data including a new voltage is received from the interface 2 during the current voltage transition of the first circuit. The new data includes a new voltage value VSEL. A stop signal is interpreted as a MISPLACED STOP as an activation signal of the first circuit to carry out a new voltage transition.

Also, the setting circuit is configured to set at least one parameter COUNTER_SET, VSEL_OLD for the first circuit to carry out the new voltage transition, in response to the new data and before the end of the current voltage transition. In this way, the first circuit 18 can start the new voltage transition without waiting that the new value of the signal COUNTER_SET is calculated by the calculation unit 15 because the new value of the signal COUNTER_SET is already calculated.

The first circuit 18 after the end of the current voltage transition from the previously received voltage value VSEL_OLD to the voltage value VSEL (before indicated as currently received voltage value VSEL and is the final point of the current voltage transition) starts the new voltage transition from the voltage value VSEL (that is, the voltage value indicated as a currently received voltage value in the preceding voltage transition and which now becomes the previously received voltage value, that is the starting point of the new voltage transition) to the new voltage value VSEL (that is, the voltage value that now becomes the currently received voltage value).

When the new data is received from the interface 2, the registers 7 and 10 are updated and the signal UPDATE_VSEL is transmitted to the multiplexer 21 for updating the register 35. The new values of VSEL_OLD, VSEL and SLEW are at the input of the calculation unit 15 which calculates the number of clock cycles COUNTER_SET before the signal TRANSITION COMPLETE is outputted by the FSM 18.

The third circuit comprises the register 10 which is adapted to store a bit called AUTO received from the interface 2 through the bus 33, and which is adapted to drive a multiplexer 13. The last is configured to initialize the FSM 18 by the signal GO or stop the FSM 18. The multiplexer 13 selects between two inputs: a stop signal MISPLACED STOP (at input 1) or an activation signal GO_BIT (at input 0). Only when new data is received from the interface 2 during a voltage transition of the first circuit 18 and wherein the new data includes a new voltage value VSEL, the bit AUTO, which is typically placed at the value "0" selecting the input at which the signal GO_BIT is present, is placed at the value "1". In this way, when a successive stop signal MISPLACED STOP arrives at the input "1" the multiplexer 13 interprets the signal MISPLACED STOP as an activation signal of the FSM 18.

Figure 2:
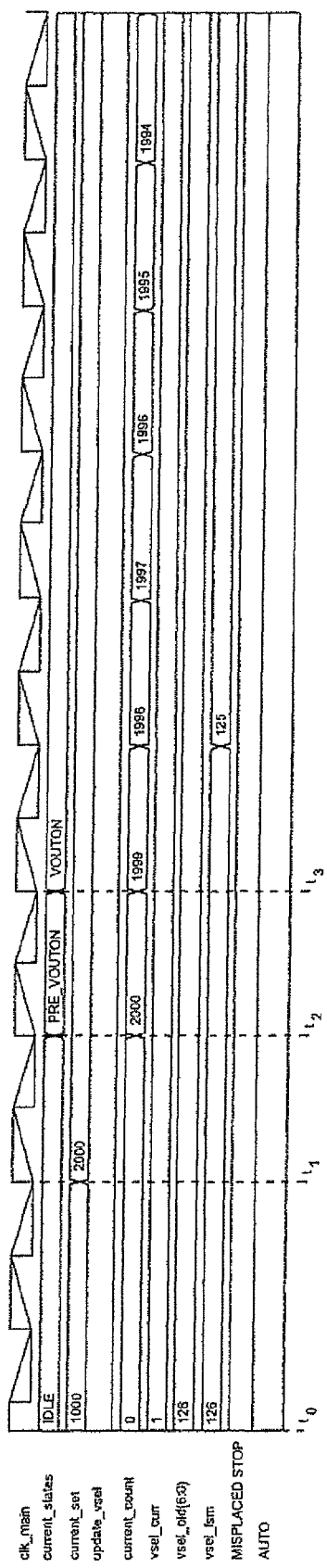
FIGS. 2-4 are timing diagrams of signals associated with the DC-DC converter shown in FIG. 1.
Figure 3:
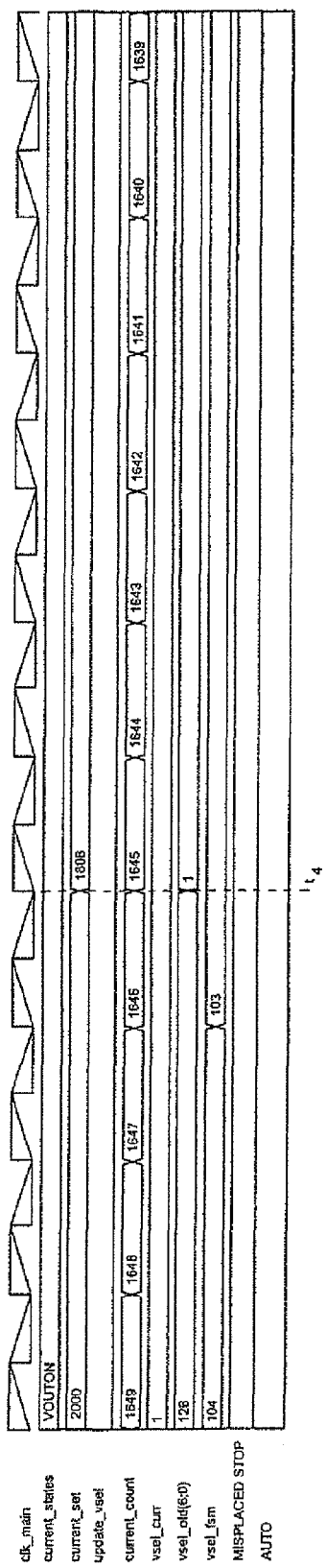
Figure 4:
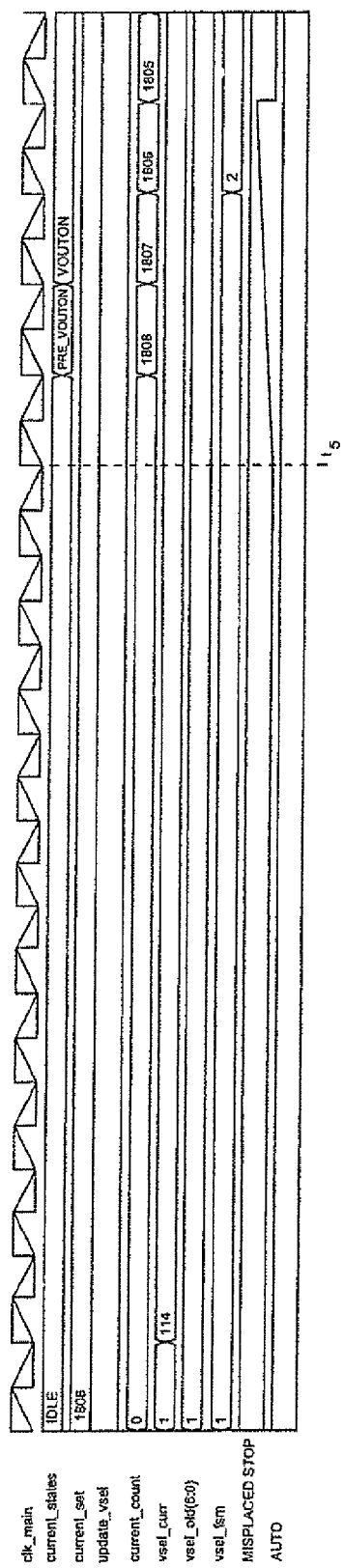

The step down DC-DC converter 1 operates as follows (FIGS. 2-4). In a first step A the microprocessor 31 is able to control the start of a typical voltage transition (at the instant of time $t_0$ in FIG. 2) of the step down DC-DC converter using the I2C communication protocol by the two lines, SDA 3 and SCL 4. The FSM 18 is in an "IDLE" state, as indicated by the signal CURRENT_STATE in FIG. 2. The current output voltage VSEL_FSM may be 126 (that is, a digital value which will be at the input of a digital-to-analog converter or DAC for obtaining the voltage analog value). The microprocessor 31 sends to the interface 2 the addresses relative to the registers 10 and 7 and the data relative to the first target value VSEL and a first slew rate SLEW.

In the same step A the interface 2 sends a digital word, preferably an 8-bit digital signal, through the bus 33 to the register 10 comprising the voltage target VSEL, which is preferably a 7-bit voltage target VSEL, and the bit AUTO. The 7-bit voltage target VSEL can assume the following values:

| 7-bit | VSEL |
|---|---|
| 0000000 | 600 mV |
| 0000001 | 604 mV |
| 0000010 | 608 mV |
| . . . | . . . |
| 1111111 | 1100 mV | while the bit AUTO is set at 0.

In step A, the interface 2 sends an 8-bit digital signal through the bus 32 to the register 7 comprising the 3-bit slew rate SLEW and the bit GO_BIT.

The 3-bit slew rate SLEW can assume the following values:

| 3-bit | Slew rate [mV/μs] |
|---|---|
| 000 | 64 |
| 001 | 32 |
| 010 | 16 |
| 011 | 8 |
| 100 | 4 |
| 101 | 2 |
| 110 | 1 |
| 111 | 0.5 | while the value of the GO_BIT is set at 1 (at a high logic level) to initialize subsequently the FSM 18.

In step A, the interface 2 enables the multiplexer 27 by an enabling signal UPDATE_VSEL on the line 6. In this way, the value VSEL_CURR in the register 17 becomes the old voltage target VSEL_OLD of the register 35. That is, the value VSEL_OLD is the preceding value of VSEL_FSM. The signal UPDATE_VSEL selects the input "1" of the multiplexers 27 only for the time needed for transferring the voltage value respectively from the registers 17 to 35.

In the same step A the value VSEL is at the input of the multiplexer 21 which, enabled by the signal TRANSITION COMPLETE derived from the FSM 18, sends the value VSEL to the 8-bit register 17. In this way, the target value VSEL becomes the current voltage target VSEL_CURR. The signal TRANSITION COMPLETE selects the input "1" of the multiplexers 21 except when the FSM 18 carries out a voltage transition. In this case, the signal TRANSITION COMPLETE selects the input "0".

In the successive step B, the calculation unit 15 sets the signal COUNTER_SET equal to value CEIL[(VSEL_OLD−VSEL)/n], where n is equal to SLEW/8 and CEIL indicates the integer number next to the value (VSEL_OLD−VSEL)/n. The value corresponds to the number of clock cycles required to complete the voltage transition from VSEL_OLD to VSEL.

In the successive step C the FSM 18 receives the signal GO from the multiplexer 13 having at its input the signal GO_BIT derived from the register 7 and enabled by the signal AUTO derived from the register 10. The FSM 18 operates with a clock signal CLK_MAIN. At the time instant $t_2$ an 11-bit down counter CURRENT_COUNT, which belongs to the FSM 18, is set to the value COUNTER_SET (for example, COUNTER_SET is 2000, as shown in FIG. 2).

At the time instant $t_2$ (FIG. 2) the FSM 18 changes the status from IDLE to PRE_VOUTON and from this instant the down counter COUNTER_COUNT will be decremented one unit each clock cycle of the signal CLK_MAIN.

In the successive step D, at the time instant $t_3$, the FSM 18 changes the status from PRE_VOUTON to VOUTON. The voltage transition starts and the value VSEL_FSM is updated starting from the value VSEL_OLD to the value VSEL_CURR by decreasing a given voltage quantity for each clock cycle. This decrease may be, for example, for each 16 clock cycles, the value VSEL_FSM is updated by decreasing by one digital unit.

If the values VSEL_CURR and VSEL_OLD are equal, no voltage transition can start when the signal GO is received by the FSM 18. Also, if the signal GO is asserted again during a current voltage transition, this will be ignored by the FSM 18 since it is in the state VOUTON.

If during a voltage transition, at the instant of time $t_4$ (FIG. 3) in the step E, a new data including a new voltage value VSEL (for example, a voltage value 114) and a new slew rate SLEW are programmed by the microprocessor 31 and received from the interface 2, the new voltage value VSEL is written in the register 10 and the new slew rate value SLEW is written in the register 7. In response to the data received by the interface, the signal AUTO of the register 10 is set high, that is, at 1. The signal UPDATE_VSEL is updated so as to enable the multiplexer 27. The voltage value VSEL_CURR shifts from the register 17 to the register 35 so that the voltage value VSEL_OLD is updated (for example, in FIG. 3 VSEL_OLD becomes 1).

Therefore, with the value of UPDATE_VSEL high (at 1), the storage of the voltage value content in the register 17 into the register 35 is permitted. This is instead of maintaining the previous value as before. In other words, the new voltage starting point for the next transition is set. In this way, the value of the COUNTER_SET is changed (COUNTER_SET is now equal to 1808) but the FSM 18, driving the voltage change, does not alter its behavior during a voltage transition. That is, a new value of the COUNTER_SET is calculated by the calculation unit 15 before the end of the current voltage transition of the FSM 18 and by way of new value SLEW, the new value VSEL and the new value VSEL_OLD.

When the current voltage transition of the FSM 18 is completed the multiplexer 21 is enabled by the signal TRANSITION COMPLETE derived from the FSM 18. In this way, the new value VSEL, which is at the input of the multiplexer 21, is transmitted to the 8-bit register 17 and the new value VSEL becomes the current voltage target VSEL_CURR. That is, the new voltage end point for the next transition is set. The signal TRANSITION COMPLETE selects the input "1" of the multiplexers 21 only for transferring the voltage value respectively from the register 10 to the register 17.

When the microprocessor 31 issues a signal MISPLACED STOP on the bus 3, at the successive instant $t_5$ (FIG. 4), all the devices connected to the bus 3 interprets this signal as a stop, so they free the bus 3, that is, the I2C line. Instead, the DC-DC converter 1 interprets the signal MISPLACED STOP as an activation signal for the FSM 18 when the signal AUTO is 1. This is while it interprets the signal MISPLACED STOP as the other I2C slave devices if the signal AUTO is 0 (FIG. 1). So the new voltage transition will start immediately after the current voltage transition is ended without any latency.

With the above approach the pin count can be reduced on the DC-DC converter used for dynamic voltage scaling while maintaining the same performance in terms of zero latency output voltage transitions.

These and other changes can be made to the embodiment in light of the above-detailed description. In general, in the following claims, the terms used should not be construed to limit the claims to the specific embodiments disclosed in the specification, and should be construed to include all possible embodiments along with the full scope of equivalents to which such claims are entitled. Accordingly, the claims are not limited by the disclosure.

The invention claimed is:

1. A DC-DC converter comprising:
an interface configured to receive data having voltage values;
a first circuit configured to perform a voltage transition from a previously received voltage value to a received voltage value;
a second circuit configured to activate or inactivate said first circuit in response to an activation signal or a stop signal provided by said interface;
a third circuit to configure said second circuit so that, when new data including a new voltage value is received during a voltage transition, said second circuit interprets the stop signal as an activation signal for said first circuit to perform a new voltage transition; and
a setting circuit configured to set at least one parameter needed by said first circuit to perform the new voltage transition in response to the new data, and before the end of the new voltage transition.

2. The DC-DC converter according to claim 1, wherein said second circuit comprises a first input to receive the activation signal and a second input to receive the stop signal, said second circuit being driven by a configuration signal provided by said third circuit to select between the first and second inputs.

3. The DC-DC converter according to claim 2, wherein said third circuit comprises a memory unit to store the data received from said interface, and in response to the data, provides the configuration signal for driving said second circuit.

4. The DC-DC converter according to claim 1, wherein the at least one parameter includes a number corresponding to a plurality of clock cycles relating to a duration of the voltage transition.

5. The DC-DC converter according to claim 4, wherein said setting circuit receives data including slew rates, and comprises a calculation unit to output the number corresponding to the plurality of clock cycles in response to a received new slew rate value.

6. The DC-DC converter according to claim 5, wherein said setting circuit calculates the number correspond to the plurality of clock cycles based on the following:

$$\text{CEIL}\left[\frac{(\text{VSEL\_OLD} - \textit{VSEL})}{n}\right]$$

wherein VSEL_OLD is a received voltage value, VSEL is a new voltage value, n is equal to SLEW/8, SLEW is a new slew rate value, and CEIL indicates an integer number next to a value (VSEL_OLD-VSEL)/n.

7. The DC-DC converter according to claim 1, wherein the at least one parameter includes the received voltage value, which represents a transition starting point.

8. The DC-DC converter according to claim 1, wherein said setting circuit provides to said first circuit a new voltage value, which represents a transition final point at an end of the voltage transition.

9. The DC-DC converter according to claim 1, wherein the previously received voltage value is a last previously received voltage value and the received voltage value is a currently received voltage value.

10. The DC-DC converter according to claim 1, wherein said first circuit is configured to perform voltage transitions from a starting point to a final point in a time succession, with the starting point being a previously received voltage value and the final point being a received voltage value so that in a new voltage transition the final point is the new voltage value and the starting point is the voltage value representing the final point of the preceding voltage transition, said first circuit also being configured to perform each voltage transition after the end of the preceding voltage transition.

11. An apparatus comprising:
a processor configured to provide data having voltage values; and
a DC-DC converter coupled to said processor and comprising
an interface configured to receive the data from said processor,
a first circuit configured to perform a voltage transition from a previously received voltage value to a received voltage value,
a second circuit configured to activate or inactivate said first circuit in response to an activation signal or a stop signal provided by said interface,
a third circuit to configure said second circuit so that, when new data including a new voltage value is received during a voltage transition, said second circuit interprets the stop signal as an activation signal for said first circuit to perform a new voltage transition, and
a setting circuit configured to set at least one parameter needed by said first circuit to perform the new voltage transition in response to the new data, and before the end of the new voltage transition.

12. The DC-DC converter according to claim 11, wherein said second circuit comprises a first input to receive the activation signal and a second input to receive the stop signal, said second circuit being driven by a configuration signal provided by said third circuit to select between the first and second inputs.

13. The DC-DC converter according to claim 12, wherein said third circuit comprises a memory unit to store the data received from said interface, and in response to the data, provides the configuration signal for driving said second circuit.

14. The DC-DC converter according to claim 11, wherein the at least one parameter includes a number corresponding to a plurality of clock cycles relating to a duration of the voltage transition.

15. The DC-DC converter according to claim 14, wherein said setting circuit receives data including slew rates, and comprises a calculation unit to output the number corresponding to the plurality of clock cycles in response to a received new slew rate value.

16. The DC-DC converter according to claim 15, wherein said setting circuit calculates the number correspond to the plurality of clock cycles based on the following:

$$\text{CEIL}\left[\frac{(\text{VSEL\_OLD} - \textit{VSEL})}{n}\right]$$

wherein VSEL_OLD is a received voltage value, VSEL is a new voltage value, n is equal to SLEW/8, SLEW is a new slew rate value, and CEIL indicates an integer number next to a value (VSEL_OLD-VSEL)/n.

17. The DC-DC converter according to claim 11, wherein the at least one parameter includes the received voltage value, which represents a transition starting point.

18. The DC-DC converter according to claim 11, wherein said setting circuit provides to said first circuit a new voltage value, which represents a transition final point at an end of the voltage transition.

19. The DC-DC converter according to claim 11, wherein the previously received voltage value is a last previously received voltage value and the received voltage value is a currently received voltage value.

20. The DC-DC converter according to claim 11, wherein said first circuit is configured to perform voltage transitions from a starting point to a final point in a time succession, with the starting point being a previously received voltage value and the final point being a received voltage value so that in a new voltage transition the final point is the new voltage value and the starting point is the voltage value representing the final point of the preceding voltage transition, said first circuit also being configured to perform each voltage transition after the end of the preceding voltage transition.

21. A method for operating a DC-DC converter comprising:
receiving at an interface data having voltage values;
operating a first circuit to perform a voltage transition from a previously received voltage value to a received voltage value;
operating a second circuit to activate or inactivate the first circuit in response to an activation signal or a stop signal provided by the interface;
operating a third circuit to configure the second circuit so that, when new data including a new voltage value is received during a voltage transition, the second circuit interprets the stop signal as an activation signal for the first circuit to perform a new voltage transition; and operating a setting circuit to set at least one parameter needed by the first circuit to perform the new voltage transition in response to the new data, and before the end of the new voltage transition.

22. The method according to claim 21, wherein the second circuit comprises a first input to receive the activation signal and a second input to receive the stop signal, the second circuit being driven by a configuration signal provided by the third circuit to select between the first and second inputs.

23. The method according to claim 21, wherein the at least one parameter includes a number corresponding to a plurality of clock cycles relating to a duration of the voltage transition.

24. The method according to claim 21, wherein the setting circuit calculates the number correspond to the plurality of clock cycles based on the following:

$$\mathrm{CEIL}\left[\frac{(\mathrm{VSEL\_OLD}-\mathit{VSEL})}{n}\right]$$

wherein VSEL_OLD is a received voltage value, VSEL is a new voltage value, n is equal to SLEW/8, SLEW is a new slew rate value, and CEIL indicates an integer number next to a value (VSEL_OLD-VSEL)/n.

25. The method according to claim 21, wherein the at least one parameter includes the received voltage value, which represents a transition starting point.

26. The method according to claim 21, wherein the setting circuit provides to the first circuit a new voltage value, which represents a transition final point at an end of the voltage transition.

27. The method according to claim 21, wherein the previously received voltage value is a last previously received voltage value and the received voltage value is a currently received voltage value.

28. The method according to claim 21, wherein the first circuit is configured to perform voltage transitions from a starting point to a final point in a time succession, with the starting point being a previously received voltage value and the final point being a received voltage value so that in a new voltage transition the final point is the new voltage value and the starting point is the voltage value representing the final point of the preceding voltage transition, the first circuit also being configured to perform each voltage transition after the end of the preceding voltage transition.

* * * * *